United States Patent Office 3,660,458
Patented May 2, 1972

3,660,458
PROCESS FOR PREPARING AROMATIC ISOCYANATES FROM AROMATIC AZO AND/OR AROMATIC AZOXY COMPOUNDS
Samuel I. Trotz, Orange, Thomas J. Hurley, Jr., Madison, and Ehrenfried H. Kober, Hamden, Conn., assignors to Olin Mathieson Chemical Corporation
No Drawing. Filed Jan. 21, 1969, Ser. No. 792,836
Int. Cl. C07c 119/04
U.S. Cl. 260—453 PC                                      11 Claims

ABSTRACT OF THE DISCLOSURE

The process for preparing an organic isocyanate by reacting an organic azo and/or an organic azoxy compound with carbon monoxide in the presence of a noble metal based catalyst at an elevated temperature and elevated pressure.

---

This invention relates to the preparation of organic isocyanates from organic azo and organic azoxy compounds.

Organic isocyanates are used extensively in the preparation of urethane foams, coatings, and fibers, as well as in the preparation of insecticides, pesticides and the like. Commercial processes for preparing organic isocyanates utilize the catalytic hydrogenation of an organic nitro compound to form the corresponding amine, followed by reaction of the amine with phosgene to form the corresponding isocyanate. These processes are complex and expensive, and the need for a simplified, less expensive process is apparent.

In order to simplify this technique, it has been proposed to react an organic nitro compound with carbon monoxide in the presence of a catalyst. For example, British Pat. No. 1,025,436 discloses a process for preparing isocyanates from the corresponding nitro compounds by reacting an organic nitro compound with carbon monoxide in the presence of a noble metal-based catalyst. This process is not used commercially because no more than trace amounts of organic isocyanates are formed when an organic nitro compound such as nitrobenzene is reacted with carbon monoxide using a noble metal-based catalyst, such as rhodium trichloride, palladium dichloride, iridium trichloride, osmium trichloride and the like. In contrast, we have now found that organic isocyanates such as, for example, phenylisocyanate, are formed in substantial amounts when organic azo and organic azoxy compounds are reacted with carbon monoxide in the presence of a noble metal based catalyst.

It is a primary object of this invention to provide a novel process for the preparation of organic isocyanates.

Another object of the invention is to provide a novel catalyst system useful in the direct conversion of organic azo and organic azoxy compounds to the corresponding organic isocyanates.

Still a further object is to provide an improved process for preparing phenyl isocyanate.

It is another object of the invention to provide an improved process for preparing toluene diisocyanate.

Another object of the invention is to provide an improved process for preparing mixtures of aromatic isocyanates.

These and other objects of the invention will be apparent from the following detailed description thereof.

It has now been discovered that the above-mentioned objects are acomplished when an aromatic azo or aromatic azoxy compound is reacted with carbon monoxide at an elevated pressure and elevated temperature in the presence of a noble metal based catalyst. Any aromatic dinitrogen compound selected from the group consisting of aromatic azo and aromatic azoxy compounds capable of being converted to an aromatic isocyanate under the reaction conditions employed may be utilized as a reactant in the process of this invention. The aryl or aromatic components may be unsubstituted or substituted as described below. The reaction of this invention effects the splitting of the azo or, in case of azoxy compound, deoxygenation and splitting of the azoxy group, and addition of a carbonyl group on each nitrogen with consequent formation of 2 moles of isocyanate for each mole of the converted starting material. The reaction can be schematically represented as follows:

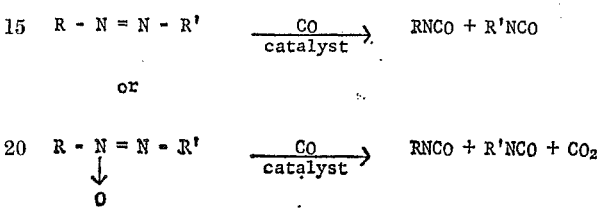

wherein R and R' are carbocyclic aryl radicals. The R groups generally contain between about 6 and about 20 carbon atoms, and preferably between about 6 and about 14 carbon atoms. The R groups may be unsubstituted or can bear substituents such as alkyl, alkenyl, aryl, aralkyl, alkoxy, halogen, hydroxy, nitro, mercapto, alkylthio, carboxy, carbalkoxy, cyano, acyl, sulfo, sulfonyl, sulfoxy, isocyanato, and the like. When the R's are alike, a single product is obtained. When the R's are not alike, a mixture of two isocyanates is obtained.

The aromatic azo compounds wherein R and R' are alike include, for example, azobenzene,
m,m'-azotoluene,
o,o'-azotoluene,
p,p'-azotoluene,
4,4'-dichloroazobenzene,
3,3'-difluoroazobenzene,
4,4'-diisocyanatoazobenzene,
3,3'-diisocyanato-4,4'-dimethylazobenzene,
3,3'-diisocyanato-2,2'-dimethylazobenzene,
2,2'-di-nitroazobenzene,
2,2'-diphenoxyazobenzene,
4,4'-diphenylazobenzene,
3,3'-divinylazobenzene,
4,4'-azo-m-xylene,
2,2',5,5'-tetramethoxyazobenzene,
2,2',4,4'-tetrachloroazobenzene,
4,4'-azodianisole,
4,4'-azobis(acetanilide),
3,3'-azodiphenol,
1,1'-azonaphthalene,
1,1'-dichloro-2,2'-azonaphthalene,
3,3'-azodibenzoic acid,
dimethyl 3,3'-azodibenzoate,
4,4'-azodibenzophenone,
2,2'-azodibenzenethiol,
4,4'-bis(methylthio)-azobenzene, etc.

Azo compounds wherein R and R' are dissimilar include, for example, m,p'-azotoluene, 4-bromoazobenzene, 2-chloroazobenzene, 4,4'-dichloro-2-nitroazobenzene, 2,4-dimethoxybenzene, 2-ethyl-2'-methylazobenzene, etc.

Aromatic azoxy compounds wherein R and R' are alike include, for example, azoxybenzene,
p,p'-azoxytoluene, 2,2'-azoxynaphthalene,
4,4'-bis(hexyloxy)azoxybenzene,
4,4'-bis(methylthio)azoxybenzene,
4,4'-bis(phenylsulfonyl)azoxybenzene,
3,3'-dibromoazoxybenzene,
4,4'-azoxydiphenetole,
4,4'-dinitroazoxybenzene,
4,4'-diphenylazoxybenzene,
4,4'-azoxydiphenol,
3,3'-azoxybis(acetanilide),
3,3'-diisocyanato-4,4'-dimethylazoxybenzene,
3,3'-diisocyanato-2,2'-dimethylazoxybenzene, etc.

Azoxy compounds wherein R and R' are dissimilar include, for example, 2-chloroazoxybenzene, 3-nitroazoxybenzene, etc. Mixtures of the aforesaid azo and/or azoxy compounds may be employed if desired. Prefered aromatic azo compounds include azobenzene, p,p'-azotoluene, 2,2-dichloroazobenzene, 3,3' - diisocyanato-4,4'-dimethylazobenzene, 3,3'-dinitroazobenzene, 3,3'-diisocyanato-2, 2'-dimethylazobenzene, and mixtures thereof. Preferred aromatic azoxy compounds include azoxybenzene, p,p'-azoxytoluene, 2,2' - dichloroazoxybenzene, 3,3' - diisocyanato - 4,4' - dimethylazoxybenzene, 3,3' - dinitroazoxybenzene, 3,3' - diisocyanato - 2,2' - dimethylazoxybenzene and mixtures thereof.

As noted above, the process of this invention is applicable to compounds with or without other substituents, such as alkyl, alkenyl, alkoxy, halogen, acylamido, hydroxy, nitro, mercapto, alkylthio, carboxy, carbalkoxy, cyano, acyl, sulfo, sulfonyl, sulfamyl, carbamyl, phosphono, phosphino and silyl radicals. Substituents do not, in general, interfere with the reaction of this invention. Certain substituents may themselves react with carbon monoxide concurrent with the desired reaction, but the latter reaction, nevertheless, occurs. Other groups in the starting material may react with the isocyanato group, thus yielding derivatives of isocyanates as reaction products. Still others may sterically retard the rate of isocyanate formulation without preventing it entirely. With these qualifications, the process of this invention is applicable to any aromatic azo or azoxy compound.

The catalyst for the reaction of this invention comprises a noble metal based catalyst. The noble metal may be used either in a metallic, alloy or chemically combined state. It may be deployed either with or without a physical support. Among the noble metals which can be employed are platinum, rhenium, palladium, ruthenium, rhodium, osmium, silver, gold and iridium. Among the chemical forms of compounds of these metals which can be used herein are oxides, sulfates, nitrates, halides, carbonates, sulfides, oxalates, cyanates, thiocyanates, cyanides, mixtures thereof and the like. Typical useful compounds of noble metals include platinum oxide, platinum dioxide, platinous cyanide, and platinum sulfate; palladium oxides such as palladium suboxide ($Pd_2O$), palladium monoxide (PdO), and palladium dioxide ($PdO_2$); rhodium oxides such as rhodium monoxide (RhO), rhodium sesquioxide ($Rh_2O_2$) and rhodium dioxide ($RhO_2$); ruthenium oxides such as ruthenium hydroxide [$Ru(OH)_2$], ruthenium dioxide ($RuO_2$), and ruthenium tetraoxide ($RuO_4$); halides of the noble metals such as palladous dibromide, palladous dichloride, palladous diiodide, rhodium tribromide, rhodium trichloride, rhodium trifluoride, rhodium triiodide; platinic bromide, platinous bromide, platinic chloride, platinous chloride, platinic fluoride, platinous iodide, platinic iodide, rhenium trichloride, rhenium tetrachloride, rhenium tetrafluoride, rhenium hexafluoride, rhenium tribromide, ruthenium trichloride, ruthenium tetrafluoride, ruthenium pentafluoride iridium tribromide, iridium, tetrabromide, iridium dichloride, ridium trichloride, iridium tetrachloride, iridium triiodide, and iridium tetraiodide, palladous cyanate, palladous thiocyanate, and palladous cyanide, rhodium cyanate, rhodium thiocyanate, and rhodium cyanide; and mixtures thereof. The preferred noble metal based catalysts are palladous dichloride, palladium dioxide, rhodium trichloride and ruthenium trichloride.

The physical form of the catalyst can be varied to suit particular needs. The noble metal based catalyst can be self-supported or deposited upon a support which disperses the metals so as to increase active surface area. Such porous supports include alumina, silica, carbon, barium sulfate, calcium carbonate, abestos, bentonite, diatomaceous earth, fuller's earth, and the like.

The reaction is carried out in the presence of a catalytic proportion of the noble metal based catalyst. The proportion of noble metal based catalyst is generally equivalent to between about 0.1 and about 100 percent, and preferably between about 1 and about 60 percent by weight of the aromatic azo or azoxy compound. However, greater or lesser proportions may be employed if desired.

The process of this invention operates effectively in the absence of a solvent, but improved overall yields of the organic isocyanates can be obtained when a solvent which is chemically inert to the components of the reaction system is employed. Suitable solvents include aliphatic, cycloaliphatic and aromatic solvents such as n-heptane, cyclohexane, benzene, toluene, and xylene, and halogenated aliphatic and aromatic hydrocarbons such as dichloromethane, tetrachloroethane, trichlorotrifluoroethane, monochloronaphthalene, monochlorobenzene, dichlorobenzene, trichlorobenzene, perchloroethylene, aromatic nitro compounds such as nitrobenzene, mixtures thereof and the like.

The proportion of solvent is not critical and any proportion may be employed which will not require excessively large equipment to contain. Generally the weight percent of aromatic azo or aromatic azoxy compound in the solvent is in the range between about 2.0 and about 75 percent, but greater or lesser proportions may be employed if desired.

The order of mixing the reactants is not critical and may be varied within the limitations of the equipment employed. In one embodiment, the aromatic azo or aromatic azoxy compound, noble metal based catalyst and, if desired, solvent, is charged to a suitable pressure vessel such as an autoclave which was previously purged with nitrogen, and which is preferably provided with agitation means such as a stirrer or an external rocking mechanism. At start-up, carbon monoxide is fed into the autoclave until a pressure is attained at ambient temperature which is generally between about 30 and about 10,000 p.s.i.g. After the reaction proceeds and heat is applied, the pressure may increase to as high as 30,000 p.s.i.g. However, greater or lesser pressures may be employed if desired.

Generally, the quantity of carbon monoxide in the free space of the reactor is sufficient to maintain the desired pressure as well as provide reactant for the process, as the reaction progresses. If desired, additional carbon monoxide can be fed to the reactor either intermittently or continuously as the reaction progresses. The total amount of carbon monoxide added during the reaction is generally between about 1 and about 50 and preferably between about 2 and about 15 moles of carbon monoxide per nitrogen atom in the aromatic azo or aromatic azoxy compound. Greater or lesser amounts may be employed if desired. The highest carbon monoxide requirements are generally utilized in a process in which the carbon monoxide is added continuously, but suitable recycle of the carbon monoxide containing gas streams greatly reduces the overall consumption of carbon monoxide.

The reaction temperature is generally maintained above about 25° C. and preferably between about 100 and about 250° C. Interior and/or exterior heating and cooling means may be employed to maintain the temperature within the reactor within the desired range.

The reaction time is dependent upon the aromatic azo or aromatic azoxy compound being reacted, temperature, pressure, and on the amount of catalyst being charged, as well as the type of equipment being employed. Usually between about ten minutes and about 20 hours are required to obtain the desired degree of reaction in a batch technique, but shorter or longer reaction times may be employed. In a continuous process, the reaction period may be much lower, i.e., substantially instantaneous, and residence time may be substantially less than batch reaction time.

The reaction can be carried out batchwise, semicontinuously or continuously.

After the reaction is completed, the temperature of the crude reaction mixture may be dropped to ambient temperature, the pressure vessel is vented, and the reaction products are removed from the reaction vessel. Filtration or other suitable solid-liquid separation techniques may be employed to separate the catalyst from the reaction product, and fractional distillation is preferably employed to isolate the organic isocyanate from the reaction product. However, other suitable separation techniques such as extraction, sublimation, etc., may be employed to separate the organic isocyanates from the unreacted aromatic dinitrogen compound and any by-products that may be formed.

Organic isocyanates produced in accordance with the technique of this invention are suitable for use in preparing polyurethane compositions such as foams, coatings, fibers, and the like by reacting the organic isocyanate with a suitable polyether polyol in the presence of a catalyst and, if desired, a foaming agent. In addition, the organic isocyanates may be used in the preparation of biologically active compounds.

The following examples are presented to describe the invention more fully without any intention of being limited thereby. All parts and percentages are by weight unless otherwise specified.

EXAMPLE 1

The reactor in this example was a clean, 100 ml. stainless steel autoclave (316 grade), which was capable of being heated with an external heating mechanism. The autoclave was also provided with a means for introducing gas to the bottom of the autoclave, and it was secured to a motor driven rocker which operated at 36 cycles per minute.

The charge to the autoclave was 1.0 g. (0.005 mole) of azoxybenzene, 0.5 g. (0.0024 mole) rhodium trichloride as catalyst, and 6 g. nitrobenzene as solvent. The autoclave was closed and carbon monoxide was introduced until a pressure of 1440 p.s.i.g. (at 19° C.) was obtained. The reaction mixture was heated at 190° C. for one-half hour with constant shaking. After cooling, the pressure was released and the product filtered. Analysis of the liquid by vapor phase chromatography showed 1.14 g. of phenyl isocyanate, a 95 percent yield based on azoxybenzene.

EXAMPLE 2

Into the 100 ml. stainless steel autoclave of Example 1 were charged 1.0 g. (0.005 mole) of azoxybenzene, 0.2 g. (0.0010 mole) rhodium trichloride as catalyst and 6 g. of o-dichlorobenzene as solvent. The autoclave was closed and carbon monoxide was introduced until a pressure of 1440 p.s.i.g. (at 19° C.) was obtained. The reaction mixture was heated at 190° C. for one-half hour with constant shaking. After cooling the pressure was released and the product filtered. Analysis of the liquid by vapor phase chromatography showed 0.52 g. of phenyl isocyanate, a 51 percent yield based on azoxybenzene.

EXAMPLE 3

Into a 100 ml. stainless steel autoclave was charged 1.0 g. of azobenzene, 0.1 g. of rhodium trichloride as catalyst, and 5 ml. of 1,2-dichlorobenzene as solvent. The autoclave was closed and carbon monoxide was introduced until the pressure of 1450 p.s.i.g. (24° C.) was reached. The reaction mixture was heated to 190° C., and held at this temperature for thirty minutes. After cooling, the pressure was released and the product filtered. Analysis by vapor phase chromatography showed that the conversion of azobenzene was 100 percent and the yield of phenylisocyanate was 41 percent.

EXAMPLE 4

Into the autoclave of Example 1 were charged 1.0 gram (0.005 mole) of azoxybenzene, 0.2 mole of palladium dichloride, and 5 ml. of orthodichlorobenzene. The autoclave was closed and carbon monoxide was introduced until a pressure of 1800 p.s.i.g. was obtained. The reactor was heated at a temperature of 190° C. for one half hour with constant shaking. After cooling, the pressure was released and the liquid product was filtered from the solid catalyst. Analysis of the liquid showed a conversion of 100 percent of the azoxybenzene, and a corrected yield of 20 percent of phenyl isocyanate.

EXAMPLE 5

The procedure of Example 4 was repeated with the exception that the charge to the autoclave was 1.0 gram azoxybenzene, 0.2 gram palladium dichloride, and 5 ml. of nitrobenzene. Analysis of the resulting liquid product showed a conversion of 99 percent of the azobenzene, with a yield of 29 percent phenyl isocyanate.

EXAMPLES 6-11

The procedure of Example 4 was repeated with the exception that the palladium chloride catalyst was replaced with the following catalyst:

| Example: | Catalyst |
|---|---|
| 6 | Ruthenium trichloride. |
| 7 | 5% palladium on carbon. |
| 8 | 5% rhodium on carbon. |
| 9 | 5% rhodium on alumina. |
| 10 | 5% ruthenium on alumina. |
| 11 | 5% palladium on alumina. |

In each example phenyl isocyanate was obtained.

EXAMPLES 12-17

The procedure of Example 5 was repeated with the exception that the palladium dichloride catalyst was replaced with one of the following catalysts:

| Example: | Catalyst |
|---|---|
| 12 | Ruthenium trichloride. |
| 13 | 5% palladium on carbon. |
| 14 | 5% rhodium on carbon. |
| 15 | 5% rhodium on alumina. |
| 10 | 5% ruthenium on alumina. |
| 17 | 5% palladium on alumina. |

In each example phenyl isocyanate was obtained.

Various modifications of the invention, some of which have been referred to above, may be employed without departing from the spirit of the invention.

What is desired to be secured by Letters Patent is:

1. A process for preparing an aromatic isocyanate which comprises reacting (A) an aromatic dinitrogen compound having a formula selected from the group consisting of (1) R—N=N—R' and

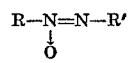

wherein R and R' are each carbocyclic aryl containing between about 6 and about 20 carbon atoms with (B) carbon monoxide
(C) at an elevated temperature and
(D) at an elevated pressure (E) in the presence of a catalyst consisting essentially of
   (1) a noble metal selected from the group consisting of
      (a) platinum,
      (b) rhenium,
      (c) palladium,
      (d) ruthenium,
      (e) rhodium,
      (f) osmium,
      (g) iridium,
      (h) gold and
      (i) silver, or
   (2) a compound of said noble metal selected from the group consisting of
      (a) halides,
      (b) oxides, and
      (c) mixtures thereof, (F) wherein the proportion of said catalyst is between about 0.1 and about 100 percent by weight of said aromatic dinitrogen compound.

2. The process of claim 1 wherein said noble metal-based catalyst is a noble metal dispersed on a porous support.

3. The process of claim 1 wherein said noble metal-based catalyst is a halide of a noble metal.

4. The process of claim 1 wherein said elevated temperature is in the range of between about 100 and about 250° C., said elevated pressure is in the range of between about 30 and about 10,000 p.s.i.g. and the proportion of carbon monoxide is in the range of between about 1 and about 50 moles of carbon monoxide per nitrogen atom in said aromatic dinitrogen compound.

5. The process of claim 4 wherein said noble metal-based catalyst is selected from the group consisting of rhodium trichloride, palladous dichloride, palladium dioxide and ruthenium trichloride.

6. The process of claim 5 wherein said aromatic dinitrogen compound is selected from the group consisting of azobenzene, p,p'-azotoluene, 2,2' - dichloroazobenzene, 3,3'-diisocyanato - 4,4' - dimethylazobenzene, 3,3'-dinitroazobenzene, 3,3' - diisocyanato-2,2'-dimethylazobenzene, azoxybenzene, p,p'-azoxytoluene, 2,2'-dichloroazoxybenzene, 3,3'-diisocyanato-4,4'-dimethylazoxybenzene, 3,3'-dinitroazoxybenzene, 3,3' - diisocyanato-2,2'-dimethylazoxybenzene and mixtures thereof.

7. The process of claim 1 wherein said aromatic dinitrogen compound is selected from the group consisting of azobenzene, p,p'-azotoluene, 2,2' - dichloroazobenzene, 3,3'-diisocyanato - 4,4' - dimethylazobenzene, 3,3'-dinitroazobenzene, 3,3' - diisocyanato-2,2'-dimethylazobenzene, azoxybenzene, p,p'-azoxytoluene, 2,2'-dichloroazoxybenzene, 3,3'-diisocyanato-4,4'-dimethylazoxybenzene, 3,3'-dinitroazoxybenzene, 3,3' - diisocyanato-2,2'-dimethylazoxybenzene and mixtures thereof.

8. The process of claim 7 wherein the proportion of said noble metal-based catalyst is between about 1 and about 60 percent by weight of said aromatic dinitrogen compound, and the proportion of carbon monoxide is in the range between about 2 and about 15 moles of carbon monoxide per nitrogen atom in said aromatic dinitrogen compound.

9. The process of claim 8 wherein said noble metal-based catalyst is selected from the group consisting of rhodium trichloride, palladous dichloride, palladium dioxide and ruthenium trichloride.

10. The process of claim 9 wherein said aromatic dinitrogen compound is azobenzene.

11. The process of claim 9 wherein said aromatic dinitrogen compound is azoxybenzene.

References Cited

UNITED STATES PATENTS 3,467,688  9/1969  Bennett et al. _____ 260—453

FOREIGN PATENTS 993,704  6/1965  Great Britain.
1,025,436  4/1966  Great Britain.

JOSEPH REBOLD, Primary Examiner

D. H. TORRENCE, Assistant Examiner

U.S. Cl. X.R.

252—441, 472, 476; 260—143, 205, 206, 207, 207.1